United States Patent [19]

Heiss et al.

[11] Patent Number: 5,542,491
[45] Date of Patent: Aug. 6, 1996

[54] SCUTTLE STRUCTURE FOR A MOTOR VEHICLE HAVING A DRIVE UNIT ARRANGED AT THE FRONT

[75] Inventors: Werner Heiss, Sindelfingen; Martin Weller, Fictenberg; Konrad Eipper, Ammerbuch, all of Germany

[73] Assignee: Mercedes Benz-AG, Stuttgart, Germany

[21] Appl. No.: 367,476

[22] Filed: Jan. 5, 1995

[30] Foreign Application Priority Data

Jan. 5, 1994 [DE] Germany ............. 44 00 132.0

[51] Int. Cl.[6] .................................................. B60K 5/00
[52] U.S. Cl. ......................................... 180/232; 296/35.2
[58] Field of Search .......................... 180/271, 224, 180/232; 296/35.2, 189

[56] References Cited

U.S. PATENT DOCUMENTS

| 3,743,347 | 7/1973 | Shaw | 296/35.2 |
|---|---|---|---|
| 3,752,247 | 8/1973 | Schwenk | 180/232 |
| 3,774,712 | 11/1973 | Froolmajou | 180/232 |
| 3,806,184 | 4/1974 | Dean | 296/35.2 X |
| 3,837,422 | 9/1974 | Schlanger | 296/35.2 X |
| 4,065,169 | 12/1977 | Yamanaka | 296/35.2 |
| 5,335,745 | 8/1994 | Goor | 180/232 |

FOREIGN PATENT DOCUMENTS

| 2118506 | 10/1972 | Germany . | |
| 2230233 | 1/1974 | Germany | 180/232 |
| 1354649 | 5/1974 | United Kingdom | 180/232 |
| WO88/00675 | 3/1988 | WIPO . | |
| WO90/02867 | 3/1990 | WIPO . | |
| WO92/20563 | 11/1992 | WIPO . | |

OTHER PUBLICATIONS

Patent Abstracts of Japan, vol. 4 No. 139 (M–34) Sep. 30, 1980, JP A 55 094863 (Mikio Kouya) Jul. 18, 1980.
Krafthand, Bd. 67, Nr. 1/2, Jan. 22, 1994, "Leichtbau Ja Aber Wie", pp. 20, 21, 22.

*Primary Examiner*—Christopher P. Ellis
*Attorney, Agent, or Firm*—Evenson, McKeown, Edwards & Lenahan

[57] ABSTRACT

A scuttle structure for a drive unit of a motor vehicle is disclosed which includes a scuttle for the drive unit which is displaced to the rear in the event of a head-on collision. A slide-down aid is fastened to the scuttle in such a way that, after shearing stress caused by a head-on collision, at least part of the slide-down aid slides down on the scuttle. By means of this scuttle structure, an intrusion of parts of the drive unit into the scuttle is prevented and the sliding-down action of the drive unit on the scuttle structure is assisted.

18 Claims, 2 Drawing Sheets

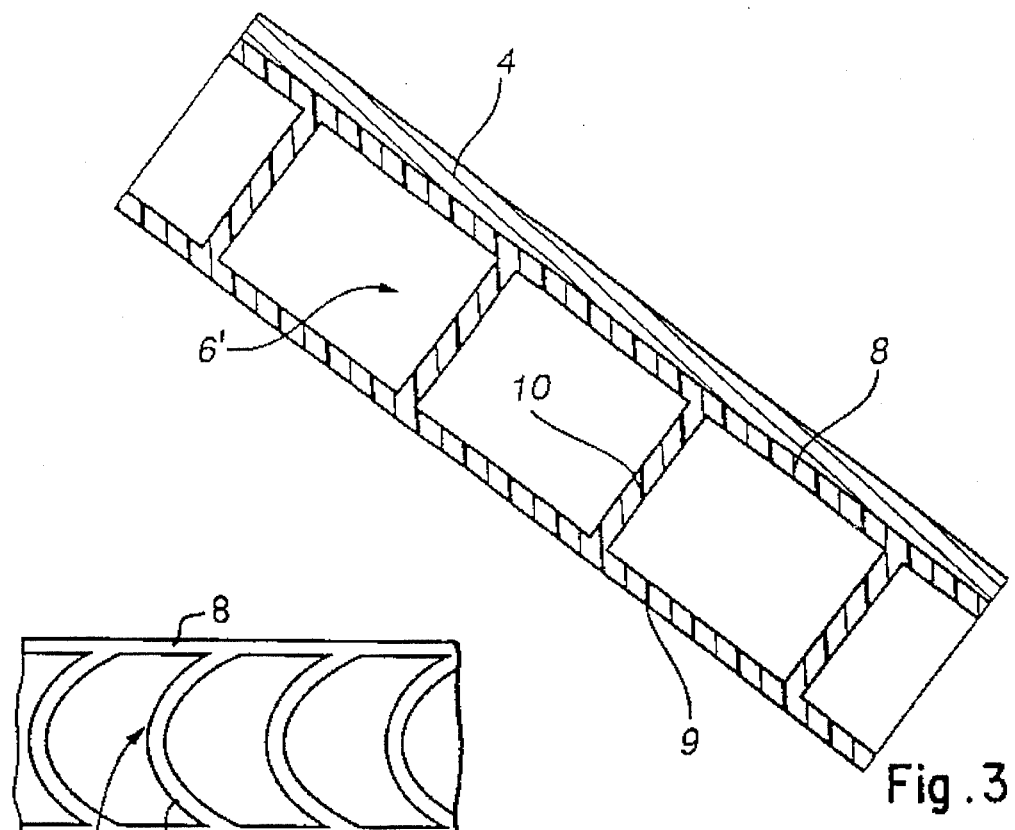
Fig. 3
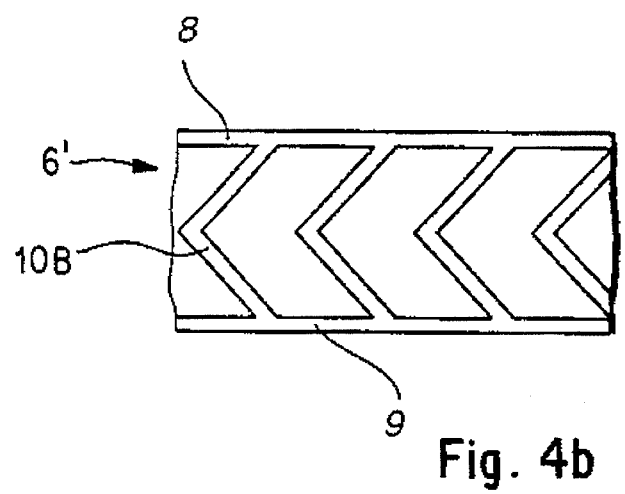
Fig. 4a
Fig. 4b
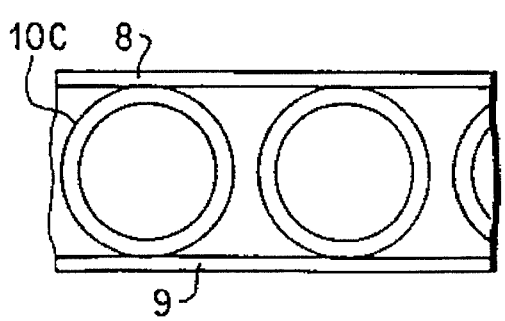
Fig. 4c

SCUTTLE STRUCTURE FOR A MOTOR VEHICLE HAVING A DRIVE UNIT ARRANGED AT THE FRONT

BACKGROUND AND SUMMARY OF THE INVENTION

The invention relates to a scuttle structure for a motor vehicle having a drive unit arranged at the front there of.

In the event of a head-on collision, the drive unit, acting as a non-deformable block, has an adverse effect on the necessary crash deformation length.

In order to increase the effective crash deformation length, a scuttle structure arranged at the vehicle front has been proposed (see WO-A-9220563) for the engine which is displaced no the rear in the event of a head-on collision. According to this publication, the drive unit and the scuttle are arranged in such a way that, during the crash, the drive unit can move towards the scuttle and, after contact with the scuttle, can slide down on this under the vehicle.

The problem of such an arrangement is that parts of the drive unit can penetrate into the scuttle and catch on the scuttle. This prevents, or at least impedes, the sliding down of the drive unit under the vehicle.

An object on which the invention is based is to prevent an intrusion of parts of the drive unit into the scuttle and to assist the sliding-down action of the drive unit on the scuttle structure.

This object is achieved according to preferred embodiments of the invention by providing an arrangement wherein a slide-down aid is provided which is fastened to the scuttle in such a way that, after shearing stress caused by a head-on collision, at least part of the slide-down aid slides down on the scuttle.

Other objects, advantages and novel features of the present invention will become apparent from the following detailed description of the invention when considered in conjunction with the accompanying drawings.

BRIEF DESCRIPTION OF THE DRAWINGS

FIG. 3 shows a representation, corresponding to that of FIG. 2, of another embodiment of a basic structure arrangement, and FIG. 4a, 4b and 4c show three exemplary embodiments of sandwich boards for use with the invention.

DETAILED DESCRIPTION OF THE DRAWINGS

Figure 1:
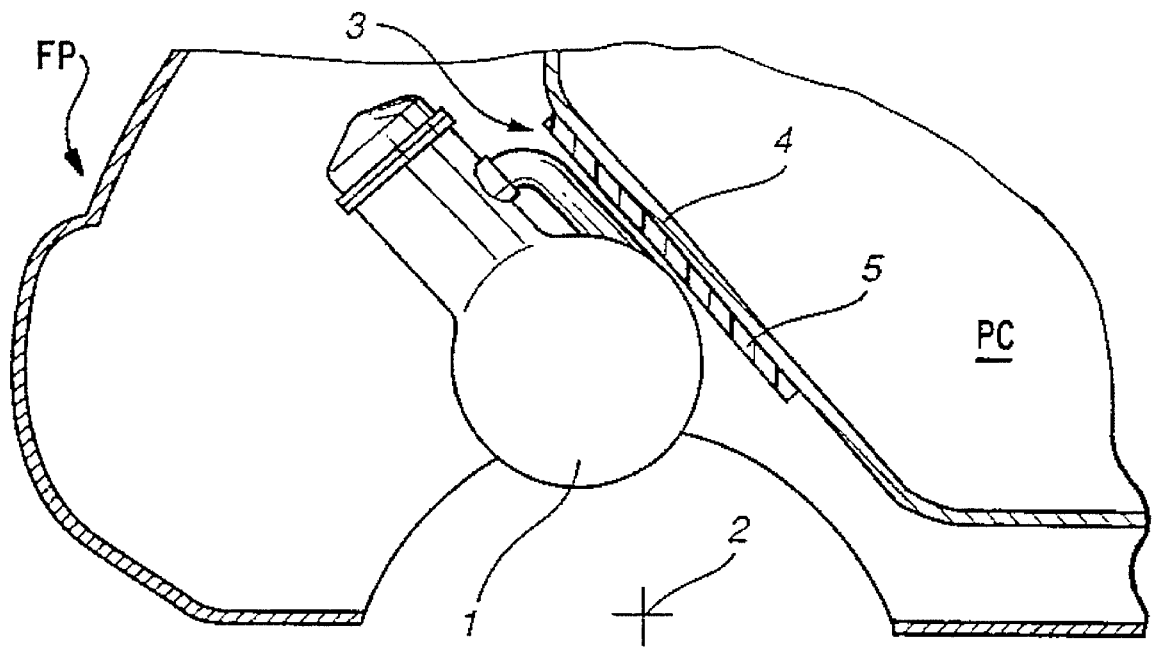
FIG. 1 is a schematic view showing a section through a front part of a motor vehicle in a longitudinal mid-plane, constructed according to a preferred embodiment of the invention.

The front part of a motor vehicle partially shown in FIG. 1 has an engine or drive unit 1. It is arranged inclined at an angle of approximately 30° to the horizontal in the form of a transversely installed reciprocating engine, in such a way that it extends with substantial regions behind the front axle 2 and only parts of the drive unit are located above the front axle 2.

At the same angle at which the engine 1 is inclined to the horizontal, a scuttle structure 3 extends adjacently to the latter.

In the event of a head-on collision, the front part FP of the motor vehicle is shortened and the engine or drive unit 1 is displaced downwards along the scuttle structure 3, without penetrating into the passenger compartment PC.

The scuttle structure 3 consists of a scuttle 4 and of a slide down aid 5. The slide-down aid 5 is fastened to the scuttle in such a way that, after shearing stress caused by a head-on collision, at least part of the slide-down aid 5 slides down on the scuttle. The sliding down of part of the slide-down aid on the scuttle prevents an intrusion of parts of the drive unit 1 into the scuttle 4. The drive unit is thereby assisted in its sliding-down action under the vehicle.

Figure 2:
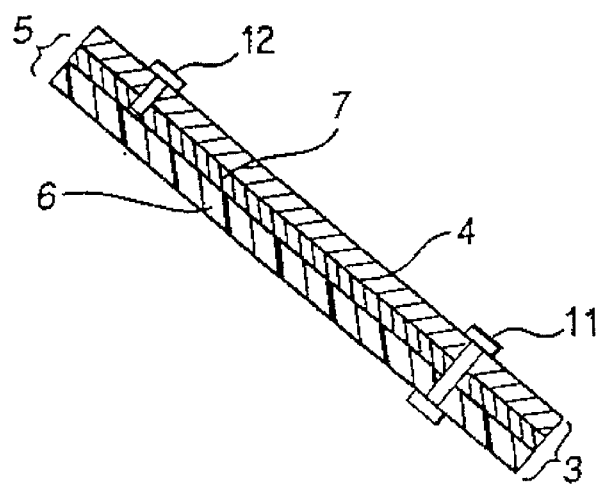
FIG. 2 shows a representation, according to that of FIG. 1, of a basic structure of the scuttle arrangement.

FIG. 2 shows a first embodiment of the scuttle structure, in which the slide-down aid 5 has a sandwich board 6. The sandwich board 6 is connected to the scuttle 4 by means of shearable connections such as rivets 11, screws 12 (expansion screws) or other fastening means not shown in any more detail in the Figure.

After the contact of the drive unit 1 with the scuttle structure 3, parts of the drive unit can penetrate into the sandwich board 6 and catch within the sandwich board. The fastenings between the sandwich board 6 and the scuttle 4 are subsequently broken. The sandwich board 6 together with the drive unit 1 caught in it slides down on the scuttle 4. For this purpose, of course, the connection technique (rivets, screws, etc.) must be selected so that the connection is broken after shearing stress caused by a head-on collision.

A sliding layer 7 which prevents corrosion and which reduces friction can also be provided between the sandwich board 6 and scuttle 4. This sliding layer 7 is preferably designed as a plastic board. It is possible, furthermore, to introduce a sliding layer 7 having micro-encapsulated lubricant between the sandwich board 6 and the scuttle 4.

As shown in FIG. 3, the sandwich board 6 can also consist of an upper board 8 and of a lower board 9 connected to the upper board by means of webs 10. In this embodiment, the upper board 8 is fastened to the scuttle 4 in such a way that the connection between the upper board 8 and the scuttle 4 is preserved in the event of a head-on collision. Instead, the connections between the upper board 8 and lower board 9 are broken in that the webs 10 break. Furthermore, the webs 10, by virtue of their geometrical shape, initiate a movement parallel to the sliding-down surface.

Three different preferred exemplary embodiments of the sandwich board 6' of FIG. 3 are shown in FIGS. 4a to 4c. The shape of the webs can thus be varied in a versatile way. In FIG. 4a, the webs 10A are semicircular, in FIG. 4b the webs 10B are V-shaped, and in FIG. 4c the webs 10C located between the upper board 8 and lower board 9 form complete circles.

The sandwich board 6, 6' both according to FIG. 2 and according to FIG. 3 can be produced from brittle plastic according to especially preferred embodiments.

It is important, at all events, that the slide-down aid 5 be fastened to the scuttle 4 in such a way that, after shearing stress caused by a head-on collision, at least part of the slide-down aid 5 slides down on the scuttle 4.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Scuttle structure for a motor vehicle having a drive unit arranged at the front of said motor vehicle, said scuttle structure comprising a scuttle, and a slide-down aid for the drive unit, said drive unit being displaced to the rear in the event of a substantially head-on collision, wherein said slide-down aid is arranged and configured to receive a portion of the drive unit which is displaced to the rear and which drive unit portion contacts the slide-down aid to create a shearing stress, and wherein said slide-down aid is releasably fastened to the scuttle such that at least part of the slide-down aid slides down on the scuttle in response to said shearing stress.

2. Scuttle structure according to claim 1, wherein the slide-down aid comprises a sandwich board.

3. Scuttle structure according to claim 1, wherein the drive unit portion penetrates into and catches on the slide-down aid to create said shearing stress.

4. Scuttle structure according to claim 1, wherein the slide-down aid further comprises a sliding layer which is provided between the slide-down aid and the scuttle.

5. Scuttle structure according to claim 2, wherein the slide-down aid further comprises a sliding layer which is provided between the sandwich board and the scuttle.

6. Scuttle structure according to claim 4, wherein said sliding layer comprises a plastic board.

7. Scuttle structure according to claim 4, wherein the sliding layer comprises a layer of micro-encapsulated lubricant.

8. Scuttle structure according to claim 1, further comprising shearable connections between at least part of the slide-down aid and the scuttle, said shearable connections being sheared by said shearing stress.

9. Scuttle structure according to claim 2, further comprising shearable connections, between at least part of the slide-down aid and the scuttle, said shearable connections being sheared by said shearing stress.

10. Scuttle structure according to claim 4, further comprising shearable connections between at least part of the slide-down aid and the scuttle, said shearable connections being sheared by said shearing stress.

11. Scuttle structure according to claim 5, wherein the shearable connections connect the sandwich layer and the scuttle.

12. Scuttle structure according to claim 10, wherein the shearable connections connect the sliding layer and the scuttle.

13. Scuttle structure for a motor vehicle having a drive unit arranged at the front of said motor vehicle, said scuttle structure comprising a scuttle, and a slide-down aid for the drive unit, said drive unit being displaced to the rear in the event of a substantially head-on collision, wherein said slide-down aid is fastened to the scuttle such that at least part of the slide-down aid slides in a downward direction with respect to the scuttle in response to a shearing stress caused by said head-on collision, and wherein the slide-down aid comprises an upper board fastened to the scuttle and a lower board connected to the upper board by means of webs which are destroyed by said shearing stress.

14. Scuttle structure according to claim 13, wherein a connection between the upper board and scuttle is preserved in the event of said shearing stress.

15. Scuttle structure according to claim 13, wherein the webs are configured to initiate a movement of the lower board in a direction parallel to said downward direction.

16. Scuttle structure according to claim 14, wherein the webs are configured to initiate a movement of the lower board in a direction parallel to said downward direction.

17. Scuttle structure according to claim 2, wherein the sandwich board is produced from brittle plastic.

18. Scuttle structure according to claim 13, wherein the slide-down aid is produced from brittle plastic.

\* \* \* \* \*